US011144809B1

(12) United States Patent
Kyllonen

(10) Patent No.: US 11,144,809 B1
(45) Date of Patent: Oct. 12, 2021

(54) TRANSPONDER ARRANGEMENT HAVING A FRAME WITH A FLEXIBLE BED AND SUPPORT MEMBERS FOR ATTACHMENT TO A CURVED SURFACE

(71) Applicant: AUTOMATED ASSEMBLY CORPORATION, Lakeville, MN (US)

(72) Inventor: Kimmo Kyllonen, Shakopee, MN (US)

(73) Assignee: AUTOMATED ASSEMBLY CORPORATION, Lakeville, MN (US)

( * ) Notice: Subject to any disclaimer, the term of this patent is extended or adjusted under 35 U.S.C. 154(b) by 0 days.

(21) Appl. No.: 16/893,042

(22) Filed: Jun. 4, 2020

Related U.S. Application Data

(60) Provisional application No. 62/858,067, filed on Jun. 6, 2019.

(51) Int. Cl.
*G06K 19/077* (2006.01)
*G06K 19/07* (2006.01)

(52) U.S. Cl.
CPC ..... *G06K 19/0776* (2013.01); *G06K 19/0723* (2013.01); *G06K 19/07773* (2013.01)

(58) Field of Classification Search
CPC .......... G06K 19/07758; G06K 19/0776; B60R 2011/0026; B60R 2011/0063; B60R 2011/0075; B60R 2011/0077; G09F 9/203; G09F 3/203
USPC ........................... 235/492; 340/572.1, 572.8
See application file for complete search history.

(56) References Cited

U.S. PATENT DOCUMENTS

| | | | | |
|---|---|---|---|---|
| 5,960,572 A | * | 10/1999 | DeVito | G09F 7/18 248/206.2 |
| 6,127,938 A | * | 10/2000 | Friedman | G07B 15/063 206/720 |
| 2010/0044123 A1 | * | 2/2010 | Perlman | G07F 15/005 180/2.1 |

* cited by examiner

*Primary Examiner* — Suezu Ellis
(74) *Attorney, Agent, or Firm* — Crawford Maunu PLLC

(57) ABSTRACT

A transponder arrangement includes a frame and a RF transponder tag. The frame has a transponder bed. A raised edge at least partially surrounds the transponder bed and forms a recessed surface on the transponder bed. The frame includes a plurality of support members attached to the transponder bed. The support members provide a ventilated air-space and separation between the transponder bed and surfaces for attachment to the target article. The RF transponder tag is attached to the frame on the recessed surface of the transponder bed.

9 Claims, 9 Drawing Sheets

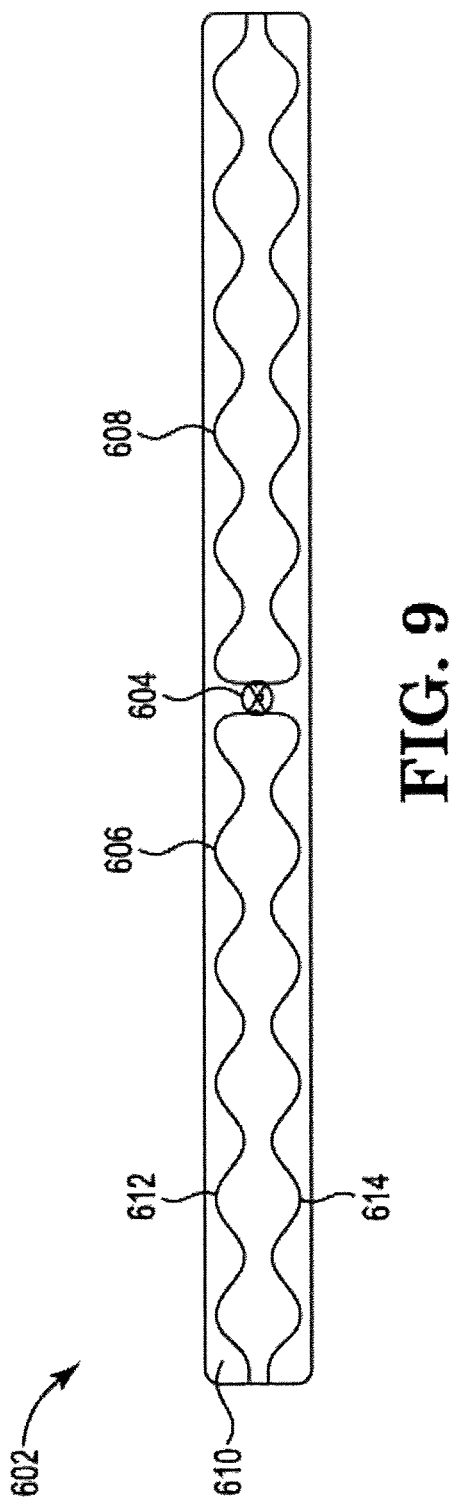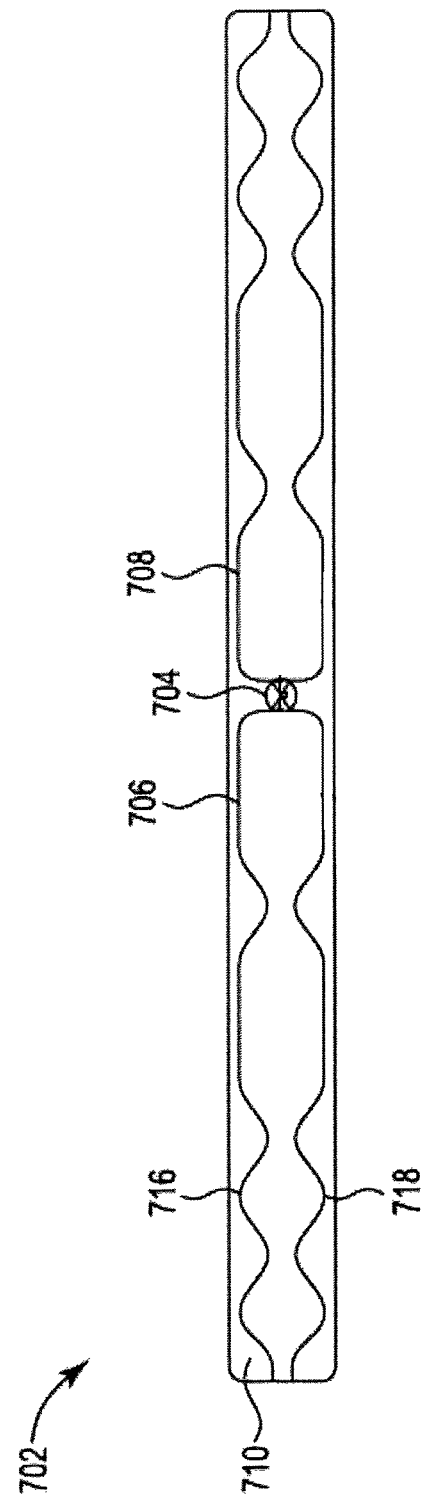
FIG. 9
FIG. 10

TRANSPONDER ARRANGEMENT HAVING A FRAME WITH A FLEXIBLE BED AND SUPPORT MEMBERS FOR ATTACHMENT TO A CURVED SURFACE

FIELD OF THE INVENTION

The disclosure describes a transponder arrangements.

BACKGROUND

Many automated toll collection systems rely on RFID technology. Example applications include collecting tolls for roadway usage, parking, use of high occupancy toll/vehicle (HOT/HOV) lanes, and access to public transportation. Other exemplary applications or RFID technology include tracking the locations of objects and controlling access to restricted areas or facilities.

RFID makers face the ongoing challenge of making RFID tags that are both functional and economically competitive. For many applications, RF transponders and associated wiring are attached to a flexible substrate. Prior to mounting the electronic device, wiring patterns may be formed on the substrate using a print-and-etch process to construct the antenna. Making RF transponder arrangements on a flexible substrate may be prohibitively expensive for some applications. The expense is attributable in part to the print-and-etch processes used in creating the wiring pattern. Expensive chemicals are required for print-and-etch processes, and hazardous waste is a byproduct.

SUMMARY

A disclosed transponder arrangement includes a frame and a RF transponder tag. The frame has a transponder bed. A raised edge at least partially surrounds the transponder bed and forms a recessed surface on the transponder bed. The frame includes a plurality of support members attached to the transponder bed. The support members provide a ventilated air-space and separation between the transponder bed and surfaces for attachment to the target article. The RF transponder tag is attached to the frame on the recessed surface of the transponder bed.

The above summary is not intended to describe each disclosed embodiment. The figures and detailed description that follow provide additional example embodiments.

BRIEF DESCRIPTION OF THE DRAWINGS

Other aspects of the invention will become apparent upon review of the Detailed Description and reference to the drawings in which:

FIG. 9 shows an RF transponder having an exemplary antenna design; and

FIG. 10 shows an RF transponder having another exemplary antenna design.

DETAILED DESCRIPTION

Figure 1:
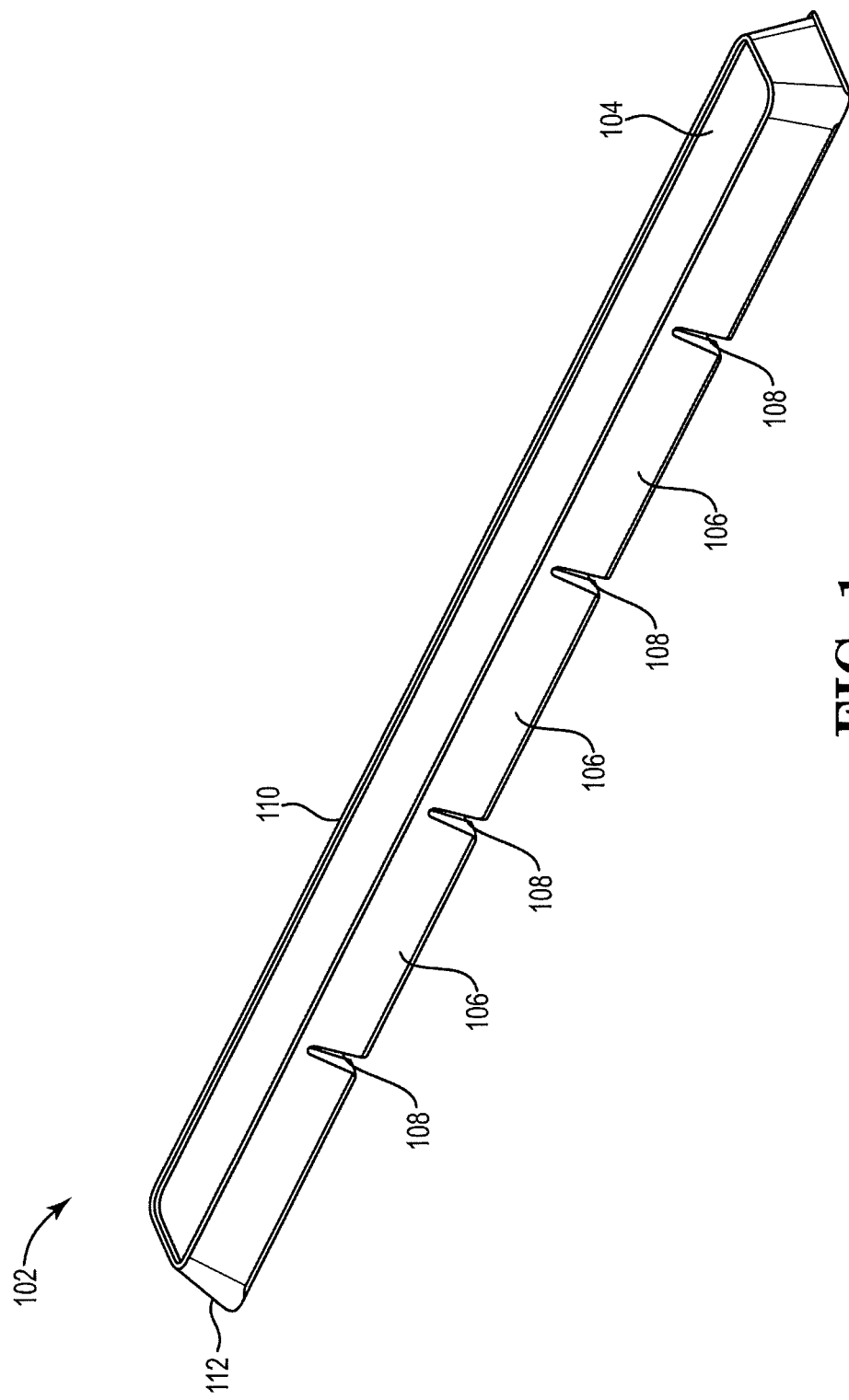
FIG. 1 shows a top perspective view of an exemplary frame.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Antenna designers face a number of challenges in designing antennas for RF transponders. The designer must design the antenna to exhibit a suitable radiation pattern and eliminate undesirable nulls. The antenna must have sufficient gain to provide a desired range and sensitivity for the intended application. The impedance of the antenna must be matched to connection pads of integrated circuitry. Even a small change to a physical characteristic of an antenna can make the antenna unsuitable for the desired application.

Changes in automotive technology present new challenges for RF transponders. In an exemplary application, an RF transponder (or "toll tag") can be attached to a window of a vehicle for purposes of collecting a toll as the vehicle passes by a reader on a roadway. Toll tags are often adhered to the inside surface of the car windshield. However, some luxury cars have metalized windshields that can block the radio frequency signals employed by the toll tags. This type of windshield can require a toll tag to be attached to the outside surface of the windshield for reliable operation.

Providing an RF transponder for attachment to the external surface of a windshield presents numerous interrelated challenges that must be carefully balanced. Factors to address include RF performance, environmental factors, aesthetic factors, manufacturability, installation, and durability. Foremost, the toll tag must provide sufficient RF sensitivity and bandwidth characteristics. The toll tag must be able to withstand temperature extremes, moisture, ice, and physical impacts (e.g., from ice scrapers), etc. The toll tag should not detract aesthetically from the appearance of the vehicle. For economic viability, manufacturing of the toll tag should be cost effective and environmentally friendly and allow sufficient throughput. The toll tag should easily installed by the driving public, conform to the curvatures of windshields, and remain functional for years once installed.

Disclosed herein is a transponder arrangement suitable for attaching to a target article, such as the windshield of a vehicle, for example. The transponder arrangement includes a frame and an RF transponder tag. The frame has a transponder bed and multiple support members. A raised edge at least partially surrounds the transponder bed and forms a recessed surface. The support members are attached to the transponder bed and provide a ventilated air-space. The support members also provide separation between the transponder bed and a surface for attachment to the target article. The RF transponder tag is attached to the frame on the transponder bed on the recessed surface. Though the disclosed RF transponder is described in some instances as being suitable for toll tag applications, it will be appreciated that the structure is not limited as such and may be suitable for many other applications, including without limitation, tracking of goods and products.

FIG. 1 shows a top perspective view of an exemplary frame 102. A transponder arrangement, such as for external application to a windshield, includes a frame and an RF transponder. The frame can be a one-piece injection-molded component of polycarbonate or other plastic that is capable of withstanding environmental stresses. The frame can be substantially hollow in order to achieve desired RF performance requirements.

The frame 102 includes multiple support members 106 that support a transponder bed 104. The transponder bed is flexible and provides a flat surface to which the RF transponder can be attached. The transponder bed has one or more raised edges 110 that at least partially surround the transponder bed and form a recessed surface on the transponder bed. An RF transponder tag can be attached to the frame on the recessed surface of the transponder bed, and the raised edge(s) serves to protect the RF tag against separating from the frame and aids in accurately placing the tag on the frame.

The frame can have multiple support members 106. The support members raise the transponder bed 104 from the surface of the target article. In an exemplary application involving a metalized windshield, the support members separate the transponder bed from the surface of the windshield by approximately 6 mm to achieve satisfactory performance. The support members are attached to the transponder bed and can provide a ventilated air-space between the transponder bed and the surface of the target article.

The support members 106 are separated by gaps 108. The gaps allow the transponder bed 104 to flex and aid in attachment of the frame 102 to a curved surface of the target article. The gaps/slots also provide ventilation and moisture to escape from hollow space(s) formed by the frame. The separated support members can also effectively divide the frame into sections and can be beneficial in maintaining the frame on the target article for long periods of time. If the integrity of the attachment between one of the support members and the target article is compromised, others attachments may be unaffected.

According to another aspect, the frame 102 has a tapered structure, covering a larger area of the target article where attached than the area of the transponder bed 104. Corner edge 112 illustrates the tapered structure. The tapered structure can protect the frame against detachment by deflecting a scraper used in situations such as scraping ice from a windshield.

Figure 2:
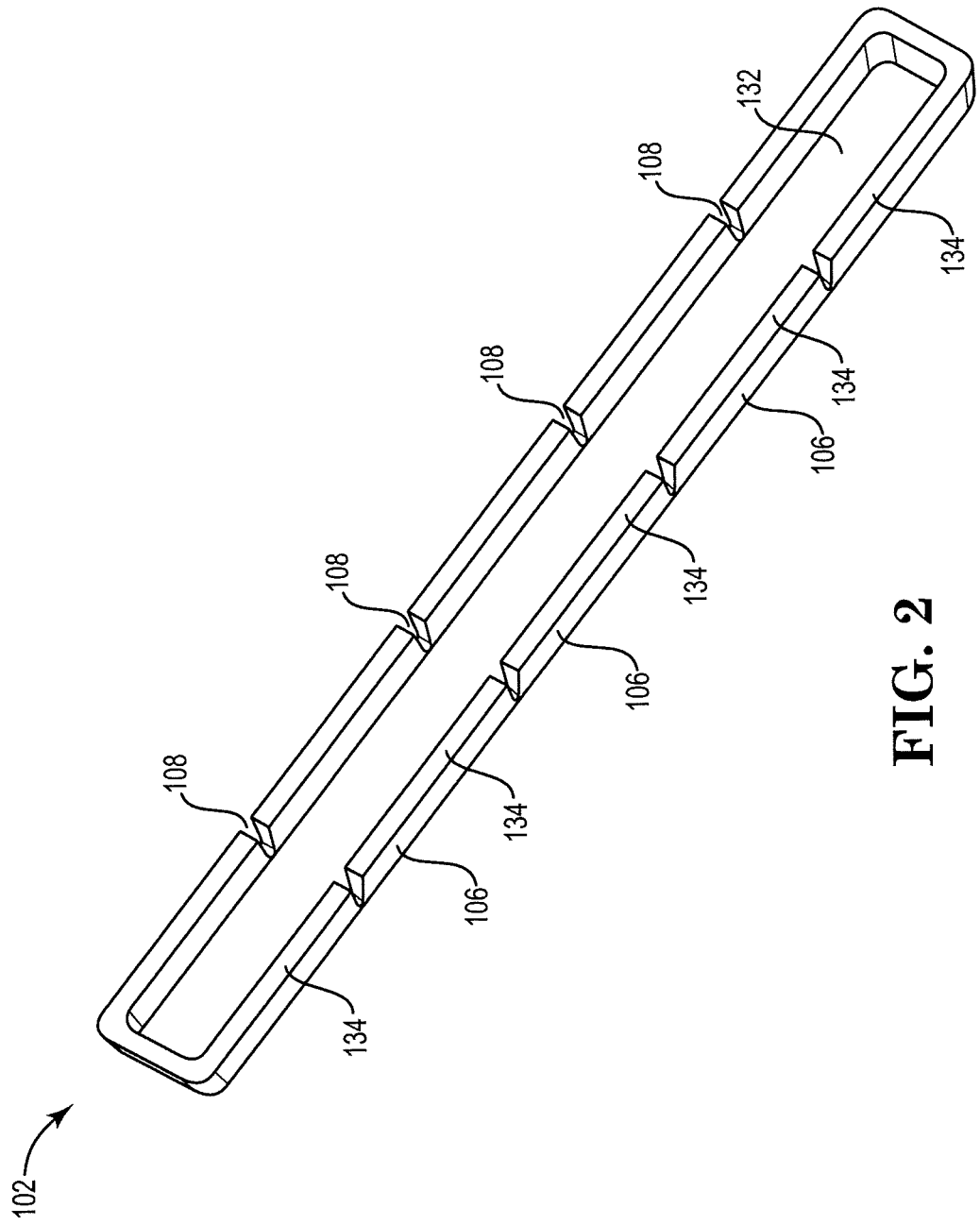
FIG. 2 shows a bottom perspective view of the exemplary frame of FIG. 1.

FIG. 2 shows a bottom perspective view of the exemplary frame 102 of FIG. 1. The support members 106 can be flanges that that extend from sides of the transponder bed. The flanges form a cavity 132 beneath the transponder bed, and adjacent ones of the flanges can be separated by a gap 108. The flanges 106 can have recessed portions (not shown) on the surfaces 134 to prevent adhesive used to attach the frame to a target article from being squeezed beyond the perimeter of the frame.

Figure 3:
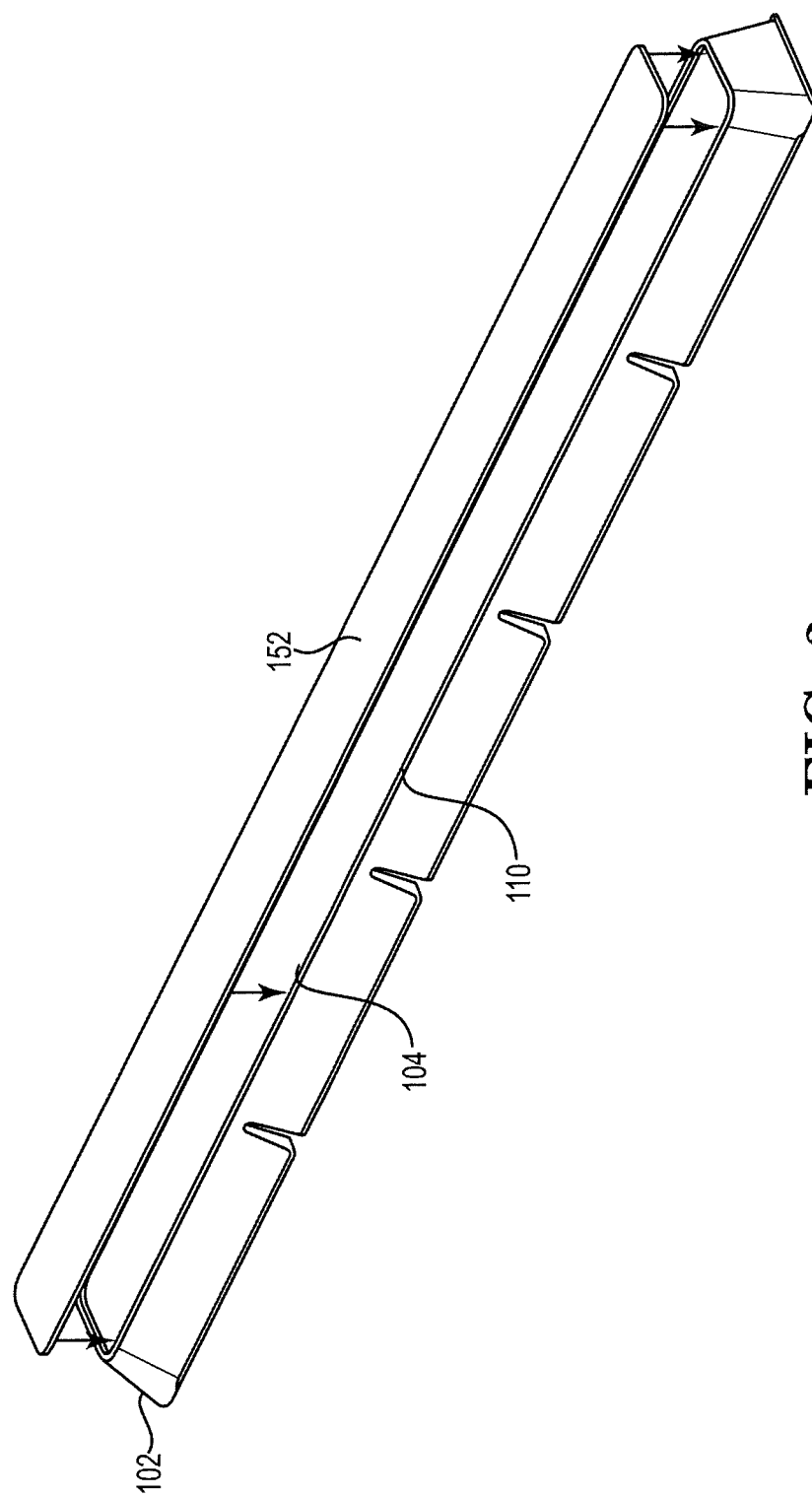
FIG. 3 shows a top perspective view of the exemplary frame of FIG. 1 and an RF transponder.

FIG. 3 shows a top perspective view of the exemplary frame 102 of FIG. 1 and an RF transponder 152 to be attached to a top surface of the frame. The RF transponder can be structured as a PET (polyethylene terephthalate) substrate having an antenna and RF transponder integrated circuit (IC) device (die or package) adhered thereto by a pressure sensitive adhesive (PSA). The antenna and IC device can be covered by a vinyl cover layer. The PSA can be laminated on the RF transponder to adhere the transponder in the recess of the transponder bed 104. The RF transponder can be sealed within the recess using a glob top for additional environmental protection. In some structures, the glob top can be in lieu of the vinyl cover layer over the antenna and IC device. In an exemplary structure, the IC device is not positioned over any of the slots 108 (see FIGS. 1 and 2).

Figure 4:
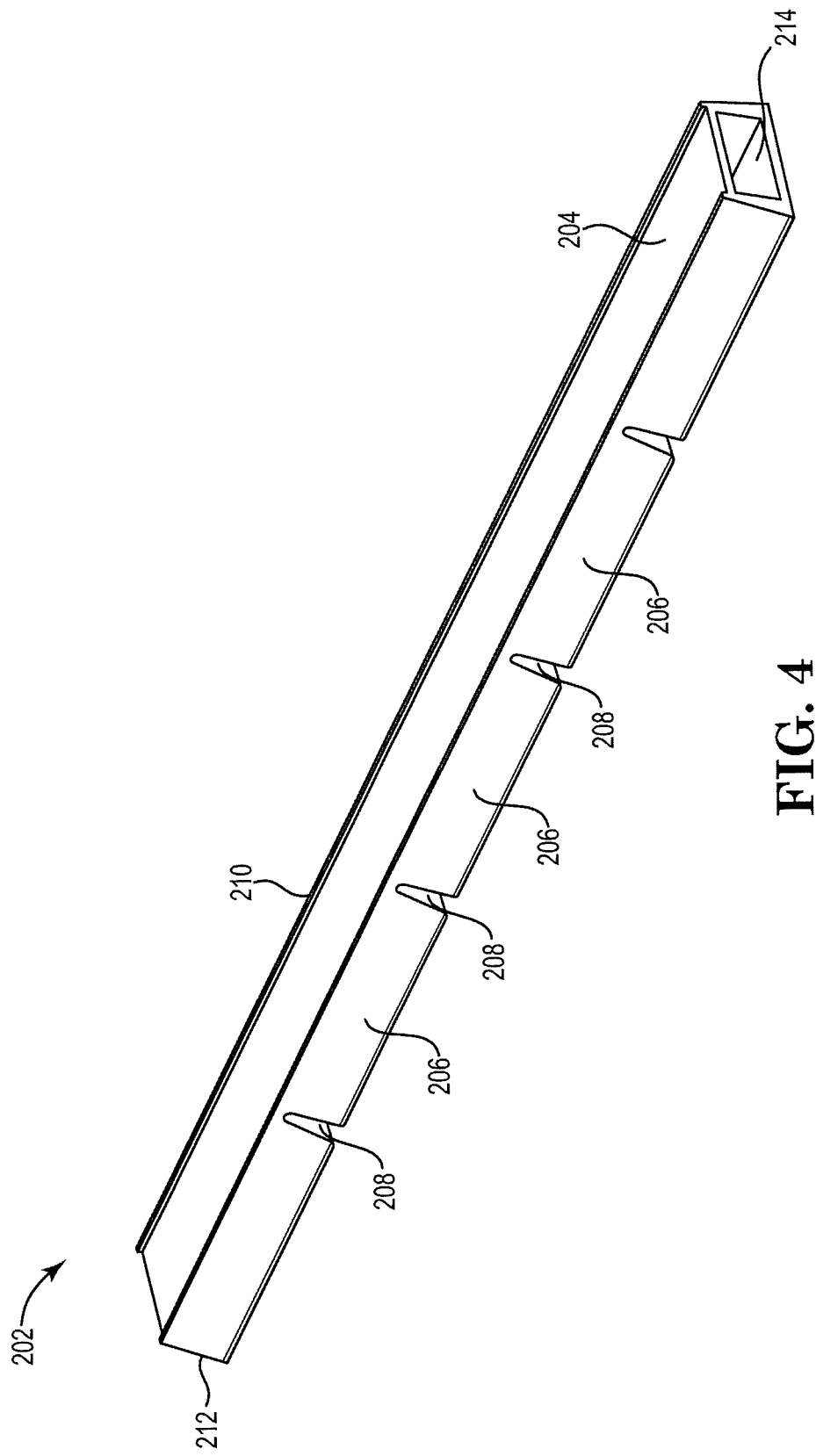
FIG. 4 shows a top perspective view of another exemplary frame.

FIG. 4 shows a top perspective view of another exemplary frame 202. The frame 202 can be formed by plastic extrusion, leaving ends 214 open. The frame 202 can have slots 208, which can be machined from the frame post-extrusion. The machined slots 208 result in support members 206, and provide functional aspects similar to the gaps 108 of frame 102. The support members form a channel beneath the transponder bed 204. The slots and open ends can aid in conforming the frame to a curved surface of a target article and allow moisture to escape from the hollow space within the frame. Other features of the frame 202 are similar to the features of the frame 102 of FIG. 1, including but not limited to, the raised edge(s) 210 forming a recessed surface of the transponder bed 204 and the tapered profile as shown by edge 212.

Figure 5:
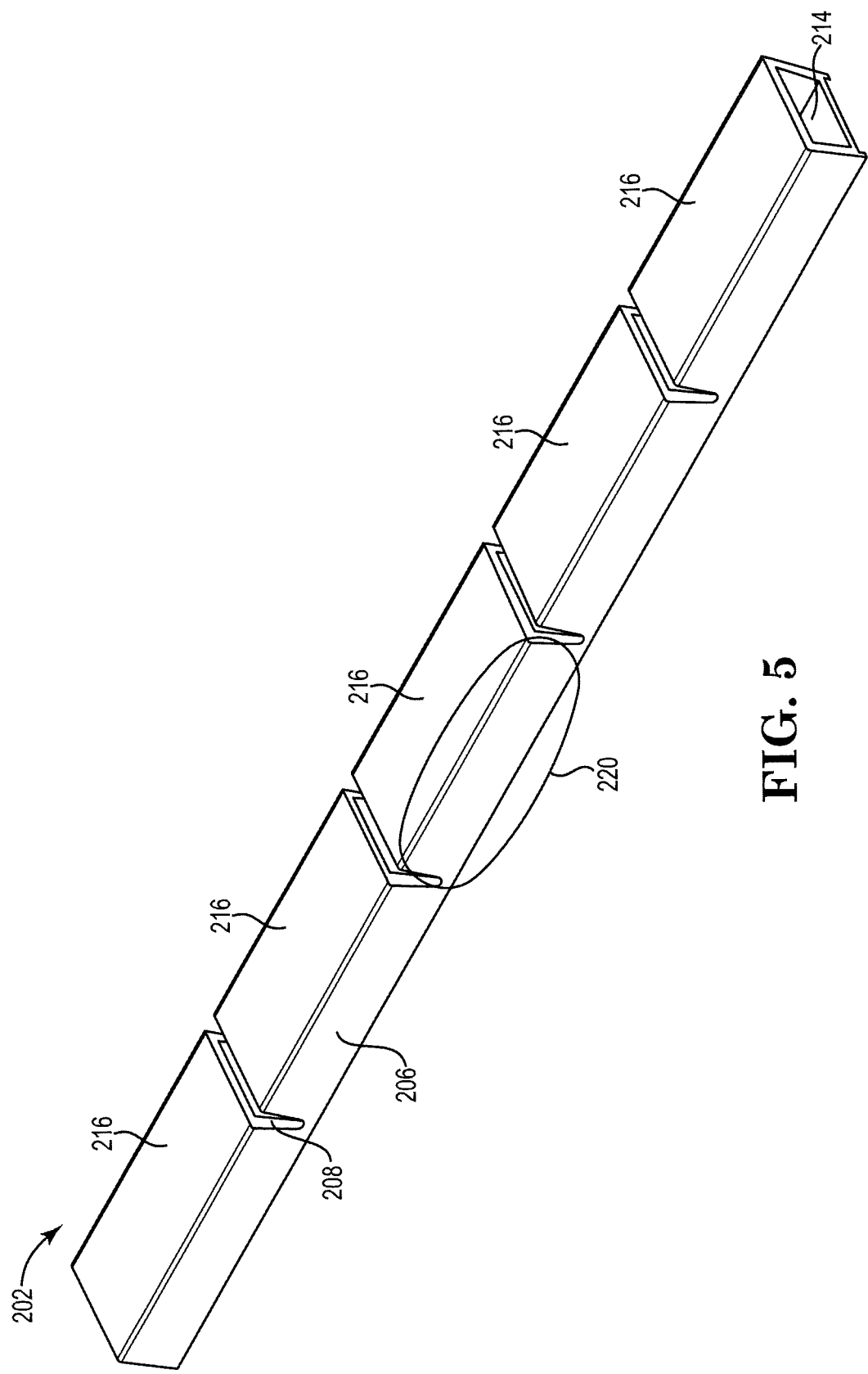
FIG. 5 shows a bottom perspective view of the exemplary frame of FIG. 4.

FIG. 5 shows a bottom perspective view of the exemplary frame 202 of FIG. 4. Each support member 206 includes two sidewalls and a pad 216. Only one of the sidewalls, for example, the sidewall within ellipse 220, of each support member is visible in the view of FIG. 5. The second sidewall of each support member is on the opposite side of the pad 216.

The first sidewall and the second sidewall extend from the surface of the transponder bed opposite the surface of the recess (FIG. 4, #204) and are connected to the pad 216 of the support member. The pad provides the surface for attachment to the target article and is much larger than the attachment surfaces provided by the flanges of the frame 102 of FIG. 2. The larger areas of pads 216 provide greater adhesive area and improve adhesion to the target article. The pad of each support member can have a recessed portion (not shown) to accommodate adhesive and prevent excess adhesive from being squeezed beyond the perimeter of the frame on the target article.

Figure 6:
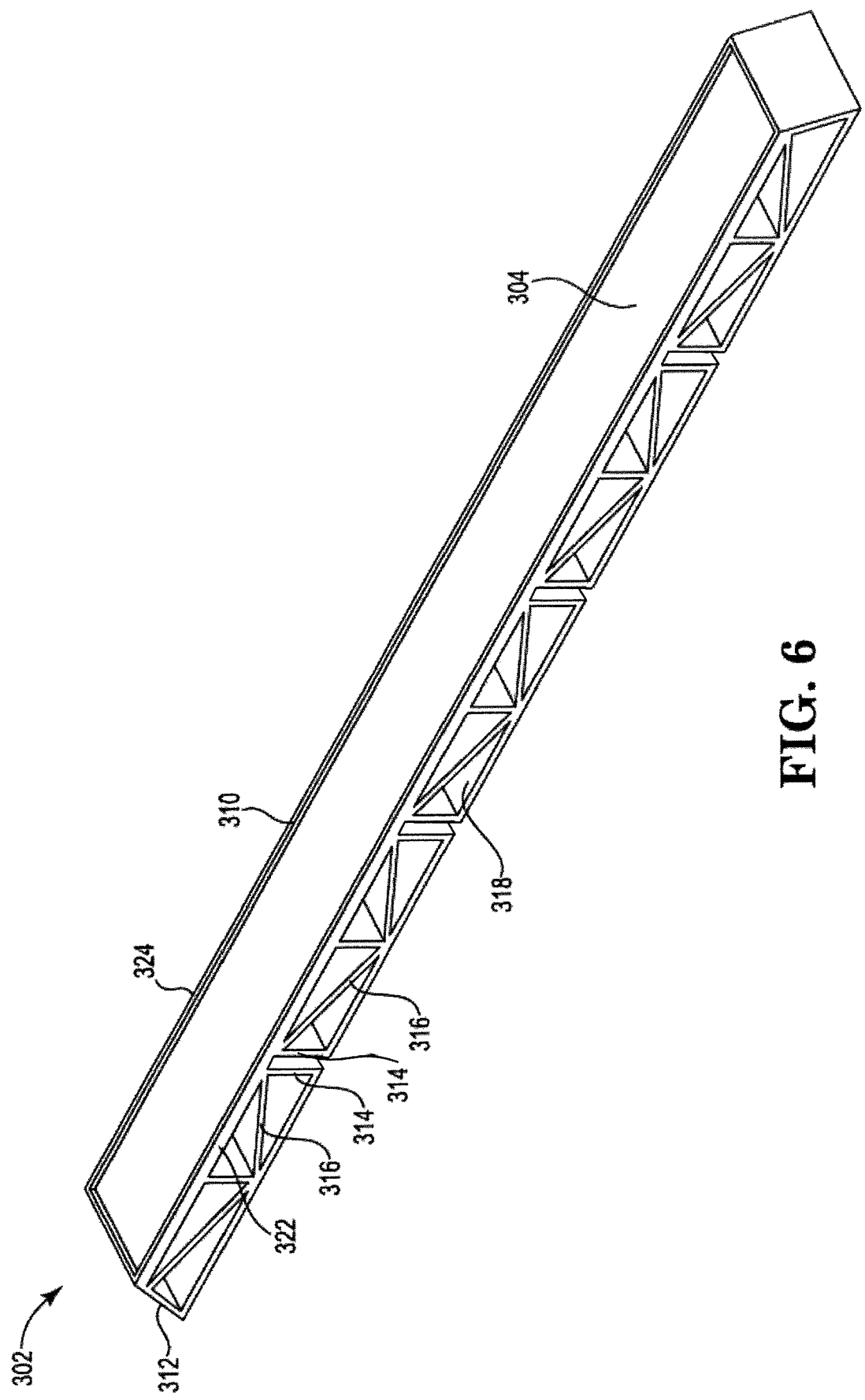
FIG. 6 shows a top perspective view of yet another exemplary frame.

FIG. 6 shows a top perspective view of yet another exemplary frame 302. The support members of frame 302 include truss members. Each truss member has one edge attached to the surface of the transponder bed 304 that is opposite the surface to which the RF transponder is attached. The other edge of the truss member is attached to the base 318. The edge of the truss member that is attached to the transponder bed extends from one side 322 of the transponder bed 304 to an opposite side 324 of the transponder bed.

The truss members can include vertical truss members 314 and inclined truss members 316. Each inclined truss member can be attached to two vertical truss members. One edge of the inclined truss member can be attached to the edge of one vertical truss member at the base 318, and the other edge of the included truss member can be attached to the edge of another vertical truss member at the transponder bed 304.

The base 318 can have a recessed portion (not shown) to accommodate adhesive and prevent excess adhesive from being squeezed beyond the perimeter of the frame on the target article. Other features of the frame 302 are similar to the features of the frame 102 of FIG. 1, including but not limited to, the raised edge 310 forming a recessed surface of the transponder bed 304 and the tapered profile as shown by edge 312.

Figure 7:
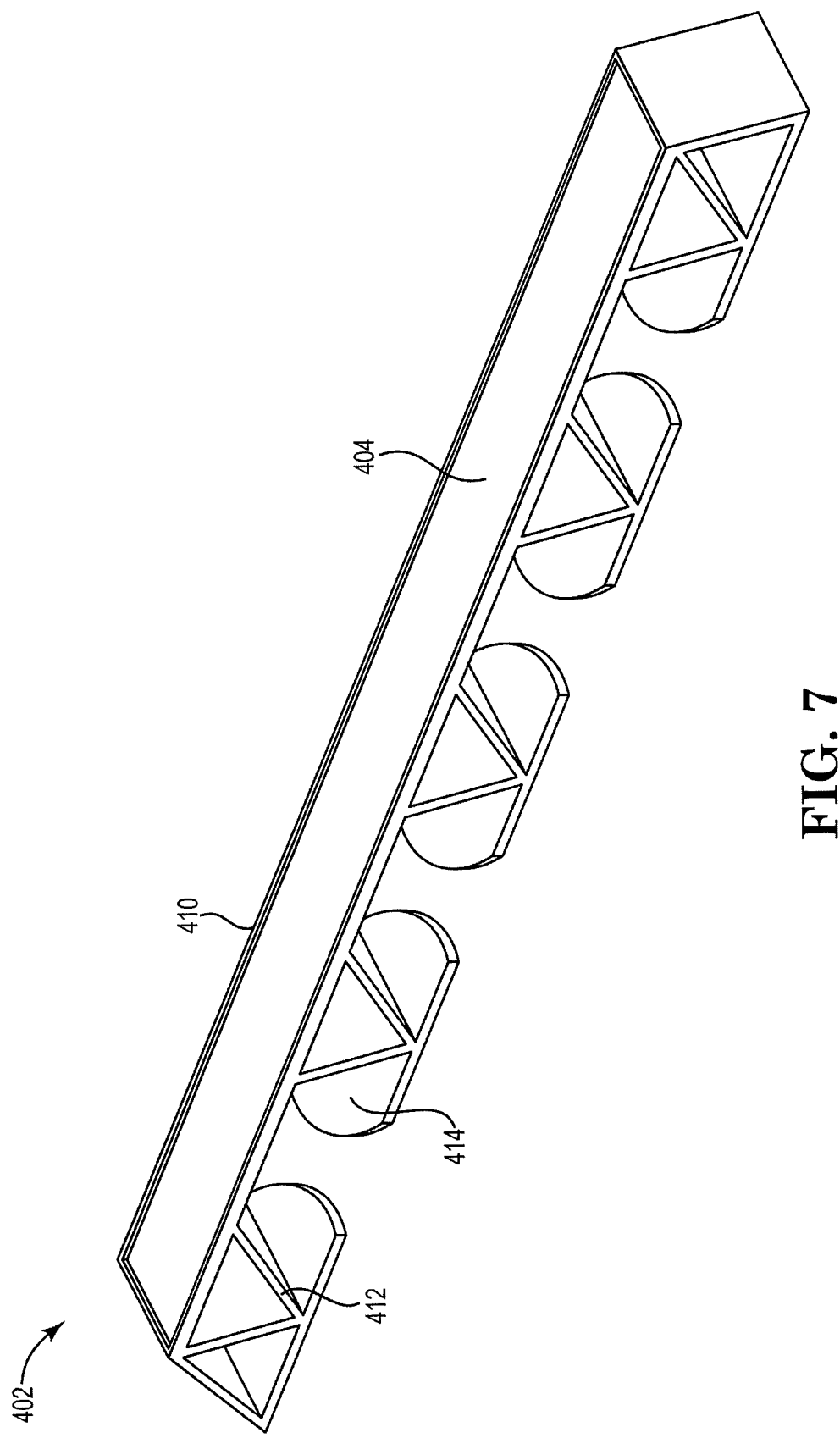
FIG. 7 shows a top perspective view of yet another exemplary frame.

FIG. 7 shows a top perspective view of yet another exemplary frame. The transponder bed 404 is supported by V-shaped supports 412 and pads 414. The open end of each V-shaped support is attached to the transponder bed, and the closed end of each V-shape support is attached to a pad. Each pad 414 can have a recessed portion (not shown) to accommodate adhesive and prevent excess adhesive from being squeezed beyond the perimeter of the frame on the target article.

Other features of the frame 402 are similar to the features of the frame 102 of FIG. 1, including but not limited to, the raised edge 410 forming a recessed surface of the transponder bed 404 and the tapered profile.

Figure 8:
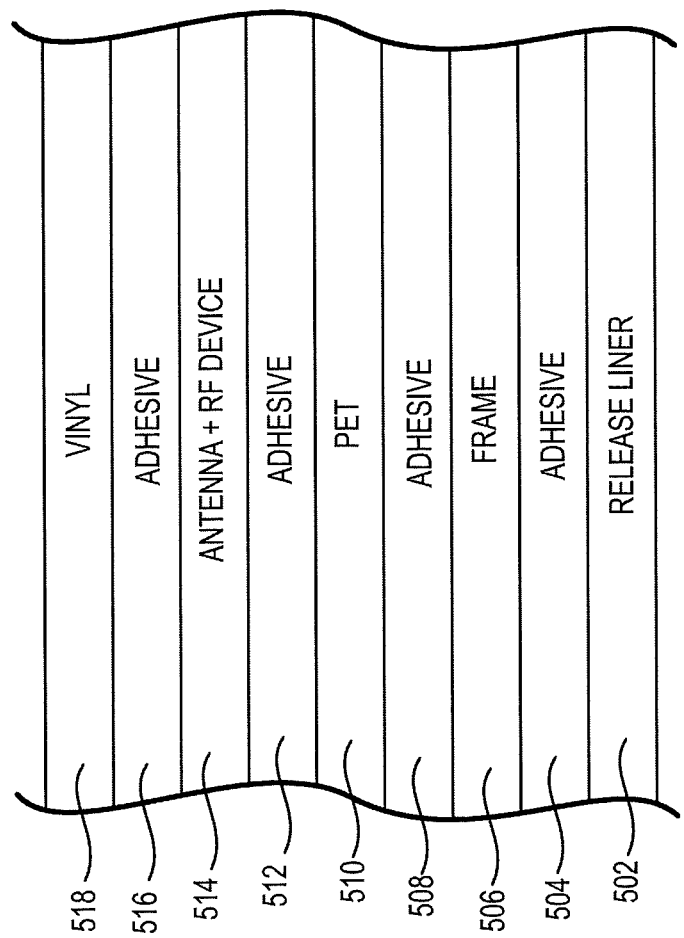
FIG. 8 shows a cross-sectional view of the stack of layers of an exemplary transponder arrangement.

FIG. 8 shows a cross-sectional view of the stack of layers of an exemplary transponder arrangement according to the disclosed frames and RF transponders. The transponder arrangement includes a release liner 502, an adhesive layer 504, a frame 506, an adhesive layer 508, a PET layer 510, an adhesive layer 512, an RF transponder 514, an adhesive layer 516, and a vinyl layer 518. The adhesive layer 504 can be a pressure sensitive adhesive, and the release liner 502 is removable to allow attachment of the transponder arrangement to a target article. The frame 506 can be a one-piece injection-molded component of polycarbonate or other plastic, for example.

The RF tag can include a substrate, such as PET layer 510, an adhesive layer 512, a layer 514 having an antenna and RF IC, and one or more protective layers 516 and 518. The RF tag can be attached to the frame 506 by adhesive layer 508, which can be a pressure-sensitive adhesive. The adhesive layer 512 can be a pressure-sensitive adhesive for attaching the antenna and RF device 514 to the substrate. The protective layer(s) can include an adhesive layer 516 and a vinyl layer 518. Alternatively, the layers 516 and 518 can be a single glob top.

FIG. 9 shows an RF transponder 602 having an exemplary antenna design suitable for the RF transponder 152 of FIG. 3. The RF transponder includes an RF transponder device 604, dipole antenna elements 606 and 608, and substrate 610. The RF transponder device can be a bare IC die or a packaged die.

The characteristics of the antenna elements 606 and 608 can improve manufacturability of the RF transponder arrangement. Rather than using expensive print-and-etch techniques for the differential antenna, the antenna elements 606 and 608 can be adhered to the substrate by a pressure-sensitive adhesive. The antenna wire is a fine gauge, round (round cross-section), bare wire. For example, 44 gauge (AWG) or equivalent copper, silver-coated copper, or aluminum wire has been found to be suitable for some applications, though the gauge and material may be different for other applications. "Wire" as used herein does not refer to printed or printed-and-etched patterns of conductive material. Rather, as used herein, wire refers to one or more strands of conductive material that have been made, for example, by drawing the conductive material through draw plates, such that the wire has a round cross section. Using a fine gauge copper wire to make antennas eliminates the use of environmentally hazardous chemicals as would be required for printing and etching.

The transponder device 604 can have connection pads exposed (facing away from the substrate), allowing the antenna wire to be laid over the connection pads in a continuous thread and then attached to the connection pads such as by soldering or welding. Antenna element 606 can be a continuous strand of wire laid over one of the connection pads of the device 604, and antenna element 608 can be a continuous strand of wire laid over the other of the connection pads of the device 604.

Antenna element 606 is symmetric to Antenna element 608 about a y-axis, and each of antenna elements 606 and 608 includes a first arm and a second arm connected to the one of the connection pads. Each of antenna element 606 and antenna element 608 is symmetric about an x-axis. For example antenna element 606 includes arms 612 and 614, and each arm can embody a wave-like pattern. The overall length of the arms, number of waves, distance between peaks of the waves, height of the waves, and separation between the arms can be adjusted to attain a suitable radiation pattern and eliminate undesirable nulls, attain a suitable range for the application, operate at a desired frequency, and have a suitable level of sensitivity. The impedance of the antenna must be matched to connection pads of integrated circuitry.

FIG. 10 shows an RF transponder 702 having another exemplary antenna design suitable for the RF transponder 152 of FIG. 3. The RF transponder includes an RF transponder device 704, dipole antenna elements 706 and 708, and substrate 710. The RF transponder device can be a bare IC die or a packaged die.

The characteristics of the antenna elements 706 and 708 can improve manufacturability of the RF transponder arrangement. The antenna elements can be made using the same wire as described above for antenna elements 606 and 608.

The transponder device 704 can have connection pads exposed (facing away from the substrate), allowing the antenna wire to be laid over the connection pads in a continuous thread and then attached to the connection pads such as by soldering or welding. Antenna element 706 can be a continuous strand of wire laid over one of the connection pads of the device 704, and antenna element 708 can be a continuous strand of wire laid over the other of the connection pads of the device 704.

Antenna element 706 is symmetric to antenna element 708 about a y-axis. Each of antenna elements 706 and 708 includes a first arm and a second arm connected to the one of the connection pads. For example antenna element 706 includes arms 716 and 718. Arm 716 is symmetric to arm 718 about an x-axis. Each arm includes a first portion having a wave-like pattern and two portions having linear segments. The two linear segments are connected by a trough congruent with a trough in the wave-like pattern.

The overall length of the arms, number of waves, distance between peaks of the waves, height of the waves, and separation between the arms can be adjusted to attain a suitable radiation pattern and eliminate undesirable nulls, attain a suitable range for the application, operate at a desired frequency, and have a suitable level of sensitivity. The impedance of the antenna must be matched to connection pads of integrated circuitry.

The present invention is thought to be applicable to a variety of applications. Other aspects and embodiments will be apparent to those skilled in the art from consideration of the specification and practice of the circuits and methods disclosed herein. It is intended that the specification and illustrated embodiments be considered as examples only, with a true scope of the invention being indicated by the following claims.

What is claimed is:

1. A transponder arrangement for attaching to a target article, comprising:
a frame having:
a flexible transponder bed and a raised edge that at least partially surrounds the transponder bed and forms a recessed surface on the transponder bed, and
a plurality of support members attached to the transponder bed and having surfaces for attachment to a curved surface of the target article, wherein the support members provide a ventilated air-space and separation between the transponder bed and the target article; and
a radio frequency (RF) transponder tag attached to the frame on the recessed surface of the transponder bed.

2. The transponder arrangement of claim 1, wherein the plurality of support members includes flanges extending from at least two opposing sides of the transponder bed and adjacent ones of the flanges extending from a side of the at least two opposing sides are separated by a gap.

3. The transponder arrangement of claim 2, wherein the flanges form a cavity beneath the transponder bed.

4. The transponder arrangement of claim 1, further comprising:
a base;
wherein:
the transponder bed has a first surface and a second surface opposite the first surface, and the RF transponder tag is attached on the first surface;
the plurality of support members includes a plurality of truss members
each truss member has a first edge attached to the second surface of the transponder bed and a second edge attached to the base; and
the first edge extends from one side of the transponder bed to an opposite side of the transponder bed.

5. The transponder arrangement of claim 1, wherein:
the transponder bed has a first surface and a second surface opposite the first surface, and the RF transponder tag is attached on the first surface;
each support member of the plurality of support members includes a first sidewall, a second sidewall, and a pad;
the first sidewall and the second sidewall extend from the second surface of the transponder bed;
the first sidewall and the second sidewall are connected to the pad;
the pad provides the surface for attachment to the target article; and
adjacent ones of the support members are separated by a gap.

6. The transponder arrangement of claim 5, wherein the plurality of support members form a channel beneath the transponder bed.

7. The transponder arrangement of claim 1, wherein:
the transponder bed has a first surface and a second surface opposite the first surface, and the RF transponder tag is attached on the first surface; and
the plurality of support members includes a plurality of V-shaped supports and a plurality of pads, each V-shaped support has an open end and a closed end, each open end is attached to the second surface of the transponder bed, and each closed end is attached to a pad of the plurality of pads.

8. The transponder arrangement of claim 1, wherein the surfaces for attachment to the target article of the plurality of support members include a recessed portion for an adhesive.

9. The transponder arrangement of claim 1, wherein the support members are configured and arranged to form tapered sides of the frame, wherein an area of the target article covered by the support members is larger than the recessed surface of the transponder bed.

* * * * *